Oct. 11, 1960 J. W. NAREL Re. 24,884

GRINDING MACHINE

Original Filed Nov. 9, 1955 6 Sheets-Sheet 1

INVENTOR
JOSEPH W. NAREL
BY
Harold W. Eaton
ATTORNEY

GRINDING MACHINE

Original Filed Nov. 9, 1955 6 Sheets-Sheet 2

INVENTOR
JOSEPH W. NAREL

BY
Harold W. Eaton
ATTORNEY

GRINDING MACHINE

Original Filed Nov. 9, 1955 6 Sheets-Sheet 3

INVENTOR
JOSEPH W. NAREL
BY
Harold W. Eaton
ATTORNEY

GRINDING MACHINE

Original Filed Nov. 9, 1955 6 Sheets-Sheet 4

INVENTOR
JOSEPH W. NAREL
BY
Harold W. Eaton
ATTORNEY

GRINDING MACHINE

Original Filed Nov. 9, 1955 6 Sheets-Sheet 5

INVENTOR
JOSEPH W. NAREL
BY
Harold W. Eaton
ATTORNEY

GRINDING MACHINE

Original Filed Nov. 9, 1955 6 Sheets-Sheet 6

INVENTOR
JOSEPH W. NAREL
BY
Harold W. Eaton
ATTORNEY

United States Patent Office

Re. 24,884
Reissued Oct. 11, 1960

24,884

GRINDING MACHINE

Joseph W. Narel, Worcester, Mass., assignor to Norton Company, Worcester, Mass., a corporation of Massachusetts Original No. 2,813,381, dated Nov. 19, 1957, Ser. No. 545,923, Nov. 9, 1955. Application for reissue Nov. 6, 1959, Ser. No. 851,486

18 Claims. (Cl. 51—105)

Matter enclosed in heavy brackets [ ] appears in the original patent but forms no part of this reissue specification; matter printed in italics indicates the additions made by reissue.

The invention relates to grinding machines, and more particularly to a crankshaft grinding machine.

One object of the invention is to provide a simple and thoroughly practical crankshaft grinding machine for automatically grinding the crankpins on a crankshaft. Another object is to provide an automatically actuated crankshaft grinding machine comprising a plurality of spaced grinding units, one for grinding each crankpin on a crankshaft. Another object of the invention is to provide an automatically actuated indexable loading mechanism for indexing crankshafts into positions adjacent to each of the grinding units. Another object of the invention is to provide a crankshaft supporting arrangement on said loading mechanism for precisely locating a crankshaft in a predetermined position so that it may be loaded vertically into the machine at each unit without the necessity of rotatably indexing the shaft. Another object is to provide a work loader at each grinding unit automatically to transfer crankshafts to and from the grinding units.

A further object is to provide an intermediate loading mechanism automatically to transfer a ground work piece from the pot chucks to an intermediate station. Another object is to provide work loaders on each unit which are arranged to pick up a crankshaft from the loading mechanism, to raise it to a transfer position, transfer said crankshaft to a position directly over said pot chucks. Another object of the invention is to provide intermediate loader mechanisms on each grinding unit which are actuated by and in timed relation with the movement of the wheel slide to a rearward position automatically to transfer a ground crankshaft from the pot chucks to an intermediate station and means actuated thereby to start the loader unit to deposit a new crankshaft to be ground in the pot chucks and thereafter to pick up a ground crankshaft from the intermediate station and to transfer it onto the loading mechanism.

Another object is to provide an automatically actuated indexing mechanism for the loading mechanism which is actuated automatically to index the mechanism when crankshafts have been picked up at positions adjacent to each grinding unit. Another object is to provide a bypass mechanism to facilitate automatically advancing the work piece on the loading mechanism in case a grinding unit is shut down. Another object of the invention is to provide pot chucks on each of the grinding units with bearing surfaces arranged to support crankshafts automatically as they are lowered vertically into the chucks with the crankpin to be ground arranged in axial alignment with the axis of rotation of the pot chucks.

Other objects will be in part obvious [of] *or* in part pointed out hereinafter.

In the accompanying drawings in which is shown one of various possible embodiments of the mechanical features of the invention;

Figure 1:
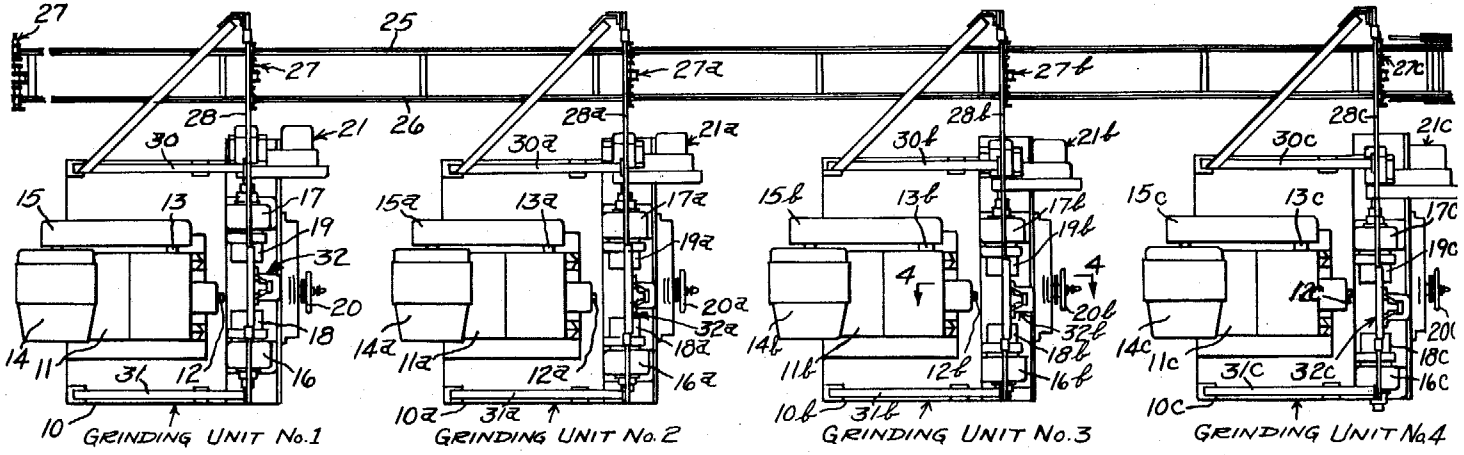
Fig. 1 is a fragmentary diagrammatic plan view of the crankshaft grinding machine, showing the work loader and transferring mechanism.
Figure 2:
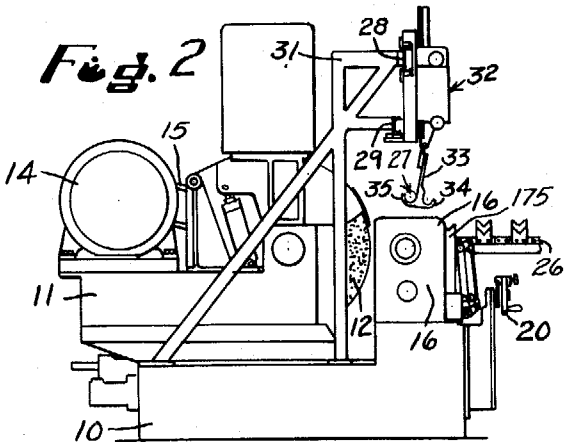
Fig. 2 is an end view of one of the grinding units.

A crankshaft grinding machine has been illustrated in the drawings comprising a plurality of crankshaft grinding units No. 1, No. 2, No. 3 and No. 4, each of which is substantially identical in construction (Fig. 1). The only difference in the construction of the grinding units is that the grinding wheel is positioned at each unit for grinding a predetermined crankpin on a crankshaft to be ground, and the pot chucks are arranged to receive and locate the crankshaft in the proper position for grinding the crankpin at each unit.

Each of the grinding units comprises a base 10 which supports a transversely movable grinding wheel slide 11 on V-ways formed on the upper surface of the base 10. The wheel slide is provided with a grinding wheel 12 supported by a wheel spindle 13 which is rotatably journalled in suitable bearings (not shown) in the wheel slide 11. A driving motor 14 is mounted on the upper surface of the wheel slide 11 and is connected by a belt drive (not shown) contained within a belt guard 15.

The base 10 also supports a pair of spaced axially aligned work heads 16 and 17 which are provided with rotatable work supporting pot chucks 18 and 19 respectively. The pot chucks 18 and 19 are synchronously rotated by a motor driven work driving unit 21.

In order to facilitate automatic loading of the pot chucks, a work stop control mechanism is provided, as a part of the work drive mechanism 21 on each of the grinding units, automatically to stop the pot chucks in a vertical or loading position so that the crankshaft to be ground may be lowered vertically into supporting position therein. This mechanism has not been illustrated since this feature is an old and well known feature in the grinding art and may be substantially identical to that shown in the U. S. reissue patent to H. A. Silven No. 20,127, dated October 6, 1936 to which reference may be had for details of disclosure not contained herein.

A suitable feeding mechanism is provided for feeding the wheel slide 11 transversely in either direction comprising a feed screw 22 (Fig. 18) which is rotatably journalled in the base 10. The feed screw 22 meshes with or engages a feed nut 23 depending from the underside of the wheel slide 11. A manually operable feed wheel 20 located on the front of the machine base 10 is provided to facilitate a manual adjustment of the feed screw 22 to facilitate adjusting and positioning the wheel slide 11 and the grinding wheel 12. The feed wheel 20 is connected to impart a rotary motion to a gear 36 which meshes with a gear 37 (Fig. 18) formed integral with a rotatable sleeve 38. The sleeve 38 is journalled in anti-friction bearings 39 and 40. The feed screw 22 is slidably keyed within a central aperture 41 formed in the sleeve 38. A hydraulically operated mechanism (not shown) is provided for imparting an axial feeding movement to the feed screw 22 to control the feeding mechanism of the wheel slide 11 and grinding wheel 12. This mechanism may be identical with that shown in [the pending application U. S. Serial No. 434,484 filed June 4, 1954 by Herbert A. Silven and Stewart S. Mader] *the patent to Silven et al. No. 2,780,-895, dated February 12, 1957,* to which reference may be had for details of disclosure not contained herein.

The improved crankpin grinding machine is arranged so that a different crankpin on a crankshaft is ground at each of the grinding stations. The crankshafts to be ground are automatically conveyed into a position adjacent to the grinding unit. A work loading unit is provided on each grinding unit for picking up a ground crankshaft and depositing a new shaft to be ground in the unit after which the ground work piece is transferred and deposited onto the conveyor and a new work piece to be ground is picked up by the work loader mechanism. As illustrated in Fig. 1 a crankshaft 27 to be ground is deposited on the left hand end of a pair of spaced roller-type conveyor chains 25 and 26. The conveyor chains 25 and 26 are arranged automatically to convey or index the crankshafts 27 successively into positions adjacent to grinding units No. 1, No. 2, No. 3 and No. 4. Each of the grinding units are provided with guide rails 28 and 29 which are arranged parallel to the axis of rotation of the pot chucks previously described. The rails 28 and 29 are supported by upwardly extending brackets or frames 30 and 31 which are fastened to the base 10. The rails 28 and 29 support a longitudinally traversable work loader unit 32 which is provided with a swinging arm 33 (Figs. [3], *2* and 8) the lower end of which is provided with a pair of oppositely extending work supporting hooks 34 and 35.

A loader unit 32 is provided for each of the grinding units No. 1, No. 2, No. 3 and No. 4. The loader units serve to transfer work pieces in a manner to be hereinafter described from the conveyor chains 25—26 into the pot chucks 18—19 and to remove work pieces from the pot chucks and deposit the ground work pieces on the conveyor chains 25—26 for indexing to the next grinding unit.

Figures 11, 12:
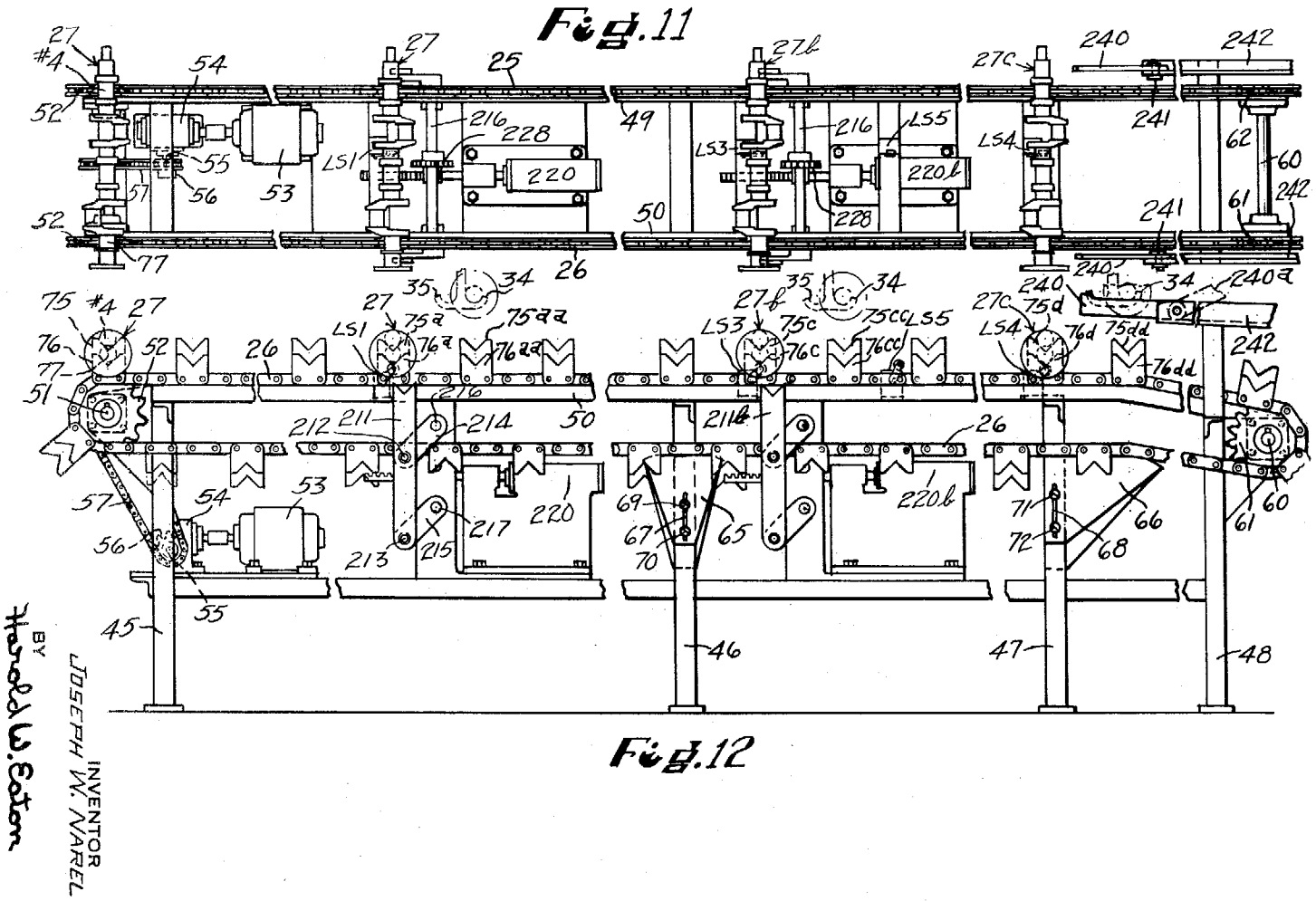
Fig. 11 is a fragmentary plan view, on an enlarged scale, of the work conveyor mechanism.
Fig. 12 is a fragmentary side elevation of the work conveyor mechanism and shown in Fig. 11.

As shown in Fig. 12 a plurality of vertically arranged supports or frames 45, 46, 47 and 48 are provided for supporting the conveyor chains 25—26. The frames

45—46—47—48 serve as a support for a pair of spaced guide rails 49 and 50 (Fig. 14) for supporting the roller chains 25—26. The frame 45 supports a rotatable shaft 51 having a pair of spaced sprockets 52 (only one of which shows in the drawings) for supporting and driving the roller chains 25—26 at the left hand end of the machine. A driving mechanism is provided automatically to index the chains 25—26 to convey work pieces such as crankshafts 27 successively into positions adjacent to grinding units No. 1, No. 2, No. 3 and No. 4. This driving or indexing mechanism comprises a motor 53 (Fig. 12) which drives a speed reducer unit 54 having a driven shaft 55. The shaft 55 is provided with a sprocket 56. A link chain 57 connects the sprocket 55 with a sprocket (not shown) fixedly mounted on the shaft 51. It will be readily apparent from the foregoing disclosure that when the motor 53 is started an indexing movement will be imparted to the roller chains 25—26.

The frame 48 at the right hand end of the machine supports a rotatable shaft 60 having a pair of spaced idler sprockets 61 and 62 which support the right hand ends of the roller chains 25 and 26 respectively. The rollers of the roller chains 25—26 are supported on the slack side of the chains by a plurality of guide brackets 65 and 66 which are adjustably mounted on the frames 46 and 47 respectively. The guide brackets 65 and 66 are provided with elongated slots 67 and 68 respectively by means of which the brackets 65 and 66 may be adjustably mounted on the frames 46 and 47. A pair of clamping screws 69 and 70 pass through the elongated slot 67 and are screw threaded into the frame 46 to clamp the bracket 65 in adjusted position. Similarly a pair of clamping screws 71 and 72 pass through the elongated slot 68 and are screw threaded into the frame 47 to facilitate clamping the guide brackets 66 in adjusted position relative to the frame 47.

Figure 14:
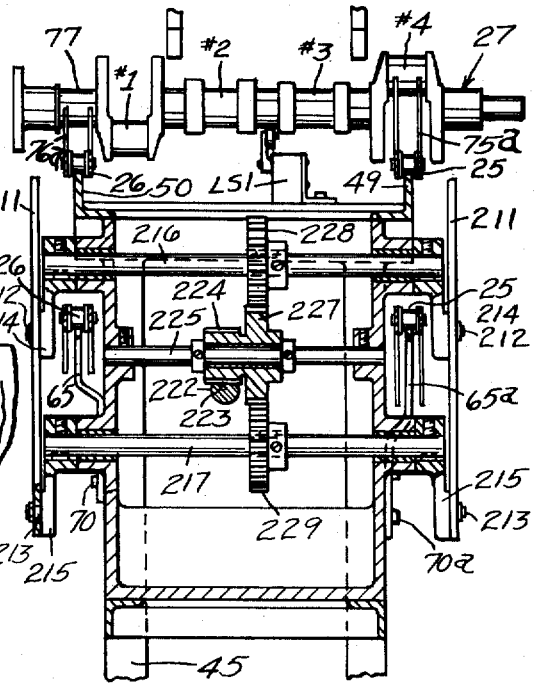
Fig. 14 is a fragmentary vertical sectional view taken approximately on the line 14—14 of Fig. 13.

As shown in Figs. 11 and 12 the roller chains 25 and 26 together with the associated parts have been broken at several positions to facilitate showing a larger scale drawing of the conveyor mechanism. The roller chains 25 and 26 serve as supports for a plurality of spaced V-shaped work supporting brackets 75 and 76. The brackets 75 carried by the link chain 25 extend upwardly above the brackets 76 which are supported on the roller chain 26. When a crankshaft is placed in the machine at the left hand end thereof, a main bearing 77 of the crankshaft 27 engages the V-shaped brackets 76 on the chain 26 and a crankpin No. 4 on the shaft 27 is supported by the brackets 75 carried by the roller chain 25 (Fig. 14). As the crankshaft 27 is positioned in the manner above described the V-shaped brackets 75 serve to locate the crankpin No. 4 in a predetermined position having its axis in a vertical plane passing through the axis of rotation of the crankshaft 27. This positioning of the crankshaft is maintained through the several indexed positions of the roller chains 25—26 to facilitate a precise positioning of the crankshaft for loading into the pot chucks for locating the successive crankpins to be ground in a manner to be hereinafter described.

The actuation of the motor 53 is controlled by a plurality of spaced limit switches LS1, LS2, LS3 and LS4 (Fig. 18) to facilitate stopping the motor 53 when the roller chains 25—26 have moved through a predetermined indexing stroke. The limit switches LS1, LS2, LS3 and LS4 are normally closed limit switches which are connected in series and are positioned so that they are engaged by a bearing surface on the work piece as it is indexed to the next station. When any one of the limit switches LS1, LS2, LS3 and LS4 are opened by movement of the work piece into engagement with the actuating member thereof, the motor 53 will be stopped thereby positioning the work pieces to be ground adjacent to grinding units No. 1, No. 2, No. 3 and No. 4 respectively. The roller chains 25—26 remain in an indexed position until the loader units, to be hereinafter described, pick up the crankshafts from positions adjacent to grinding units No. 1, No. 2, No. 3 and No. 4. The limit switches LS1, LS2, LS3 and LS4 are connected in series so that when all of the crankshafts have been picked up by the loader units, the circuit will be closed to start the conveyor motor 53 to cause the next indexing movement of the chains 25—26.

Figure 15:
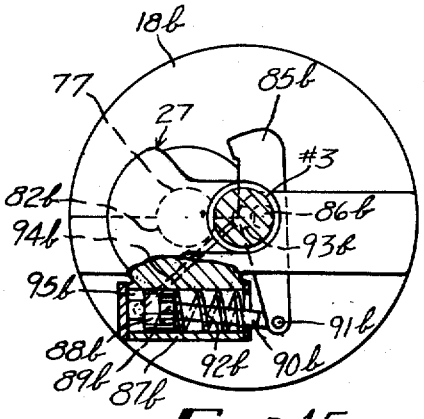
Fig. 15 is an enlarged view of one of the pot chucks at grinding station No. 3, partly broken away and shown in section to illustrate the work clamping mechanism.
Figure 16:
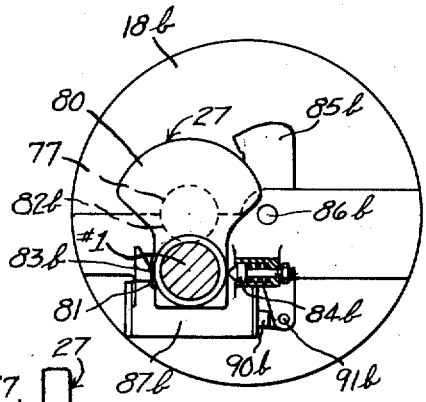
Fig. 16 is an enlarged view of one of the pot chucks at grinding station No. 3, showing the work locating mechanism.
Figure 17:
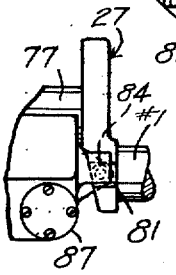
Fig. 17 is a fragmentary right hand side elevation of the chuck, as shown in Fig. 16.

As above explained the V-shaped brackets 75 and 76 serve to position a crankshaft adjacent to each of the grinding units No. 1, No. 2, No. 3 and No. 4 so that the crankshafts are in the proper position for loading into the pot chucks for a grinding operation. As shown in Figs. 15 and 16, one of the pot chucks of each pair, namely, the left hand pot chuck on each grinding unit is provided with a positioning mechanism precisely to locate and support the crankshaft with its axis of rotation offset relative to the axis of rotation of the pot chuck so that the crankpin to be ground is aligned with the axis of rotation of the pot chuck. The crankshafts 27 are each provided with a locating surface 81 on a crank arm 80. As the crankshaft 27 is lowered into operative engagement with the pot chucks (Figs. 5 and 16) a main bearing surface of the crankshaft 27 moves into engagement with a half bearing surface 82 which is fixedly supported on the pot chuck. The crank arm 80 moves into a posion between the locating surface 83 on the pot chuck and the left hand end of a spring pressed plunger 84 (Fig. 16) which serves to exert a force on the crank arm 80 so that the locating surface 81 on the crank arm is moved into engagement with a locating surface 83 fixedly mounted on the pot chuck 18.

The pot chucks 18—19 on each of the grinding units No. 1, No. 2, No. 3 and No. 4 are designed and arranged so that when crankshafts supported with the crankpins oriented in the same positions by the roller chains 25—26 and loader hooks 34—35 are lowered substantially vertically into the pot chucks 18—19, the crankpin to be ground is precisely positioned with its axis coinciding with the axis of rotation of the pot chucks 18—19, thereby eliminating the necessity of rotatably indexing the crankshaft as they are loaded into each grinding unit. It should be noted that the half bearing surfaces 82 for supporting the crankshafts 27 to be ground on each of the pot chucks 18—19 (Figs. 4 and 5) are located in different positions relative to the axis of rotation of the pot chucks to facilitate such a loading operation. Each of the pot chucks are provided with a work clamping jaw or arm 85 which is pivotally supported by a pivot stud 86 carried by the pot chuck. Each of the pot chucks is provided with a hydraulically operated clamping mechanism comprising a cylinder 87 fixedly mounted on the pot chucks. The cylinder 87b contains a slidably mounted piston 88b which is connected by a stud 89 with the left hand end of a connecting rod 90b (Fig. 15). The other end of the connecting rod 90b is connected by a stud 91b with the lower end of the clamping arm 85b. A compression spring 92b is contained within the cylinder 87b and located between the piston 88b and the right hand end cap of the cylinder. The spring 92b serves normally to hold the piston 88b in its left hand end position as shown in Fig. 15 with the clamping jaw 85 in an inoperative or unclamped position. When it is desired to clamp a crankshaft 27 in the pot chucks 18b and 19b fluid under pressure is passed through a central passage 93b formed in the spindles supporting the pot chucks, through a passage 94b formed in the pot chucks into a cylinder chamber 95b formed at the left hand end of the cylinder 87b to move the piston 88b toward the right (Fig. 15) thereby swinging the clamping jaw 85b in a counter-clockwise direction to clamp a main bearing 77 rigidly in engagement with the half bearing 82. This type of hydraulically operated pot chuck is an old and well known chuck in the crankpin grinding art and, therefore, has not been shown in detail.

Figure 3:
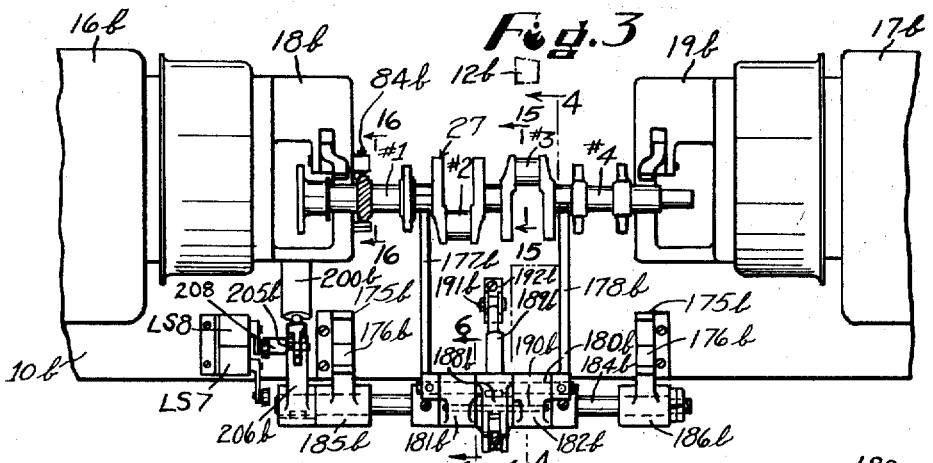
Fig. 3 is a fragmentary plan view of one of the grinding units, showing the work supporting pot chucks, and a portion of the transferring mechanism.
Figure 5:
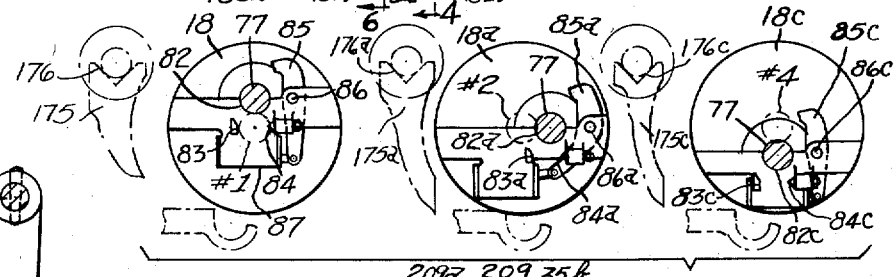
Fig. 5 is a diagrammatic view showing the relative positions of the pot chucks at grinding units No. 1, No. 2, and No. 4.

As shown in Figs. 3 and 5, when a crankshaft 27 is dropped vertically into position in the pot chucks 18 and 19, at grinding unit No. 1, the main bearing 77 is supported by the half bearing 82 so that crankpin No. 1 is precisely positioned with its axis coinciding with the axis of rotation of the pot chucks 18 and 19.

Similarly when a crankshaft 27 is dropped into position in the pot chucks 18a and 19a at grinding unit No. 2, the main bearing 77 of the crankshaft 27 engages the half bearing 82a so as to precisely position crankpin No. 2 so that its axis coincides with the axis of rotation of the pot chucks 18a and 19a.

When a crankshaft 27 is dropped into position in the pot chucks 18b and 19b at grinding unit No. 3, the main bearing 77 engages a half bearing 82b so as to precisely position the crankpin No. 3 with its axis coinciding with the axis of rotation of the pot chucks 18b and 19b.

When a crankshaft 27 is dropped into supporting engagement with the pot chucks 18c and 19c at grinding unit No. 4, the main bearing 77 is supported by a half bearing 82c precisely to position crankpin No. 4 with its axis coinciding with the axis of rotation of the pot chucks 18c and 19c. Each of these sets of pot chucks are provided with locating surfaces 83, 83a, 83b and 83c together with spring pressed plungers 84, 84a, 84b and 84c to precisely locate the crankshaft as above described. The locating surfaces above described together with the spring pressed plungers are provided only on the left hand pot chuck of each pair.

After the crankshafts have been located as above described, fluid under pressure is passed into the pot chuck cylinder chamber on each chuck to swing the clamping jaws 85, 85a, 85b and 85c into an operative position to clamp the crankshaft 27 in position in the pot chucks.

A longitudinally traversable loader unit 32, 32a, 32b and 32c is provided at each of the grinding stations No. 1, No. 2, No. 3 and No. 4 respectively for automatically conveying a crankshaft 27 from the roller chains 25—26 into the pot chucks. These loader units are substantially identical with that shown in the pending application Serial No. 467,306 filed November 8, 1954, by Joseph W. Narel and Glover C. Joyce, now issued as United States Patent No. 2,749,674 dated June 12, 1956, to which reference may be had for details of disclosure not contained herein. All of the loader units 32, 32a, 32b and 32c are identical in construction and consequently only one of these units, namely, unit 32 will be described in detail as shown in Figs. 7, 8, 9, and 10. The loader unit 32 is provided with a plurality of spaced pairs of rollers 100—101 and 102—103 which ride upon the upper and lower surfaces of a longitudinally extending channel iron or slideway 28. In order to steady the loader unit 30, a plurality of pairs of rollers 104—105 supported on the unit 32 are arranged to engage opposite side faces of a slideway 29.

A traversing mechanism is provided for traversing the loader unit longitudinally relative to the slideways 28 and 29 which may comprise a fluid motor 110 supported on a bracket 111 which is fixedly mounted on the loader unit 32. The motor 110 is provided with a driven pinion 112 which meshes with a rack bar 113 which is fixedly mounted on the slideway or channel iron 28. It will be readily apparent from the foregoing disclosure that a rotary motion imparted to the pinion 112 will transmit a longitudinal traversing movement to the loader unit 32.

The loader unit 32 is provided with a vertically movable slide 114 which is supported by a plurality of pairs of anti-friction rollers 118—119 which are in turn supported on the loader unit 32. The slide 114 is arranged to move in a vertical direction in a manner to be hereinafter described. The slide [45] *114* is provided with a pair of spaced parallel ribs 114a and 114b which serve to support a slide actuating mechanism. The pivotally mounted arm 33 is supported by a stud 115 (Figs. 7 and 8) carried by the vertical slide 114. The pivotally mounter arm 33 is provided with a pair of spaced vertically arranged work engaging brackets 116 and 117 the lower ends of which are formed as oppositely extending hooks 34 and 35. The hooks 34 and 35 are arranged to engage spaced main bearings on the crankshafts 27 to be ground.

A suitable mechanism is provided for moving the slide 114 vertically and also to swing the pivotally mounted arm 33 together with the work engaging hooks to facilitate depositing a ground shaft on the roller chains 25—26, picking up a new crankshaft therefrom, raising it, transferring it longitudinally and lowering it and depositing it in supporting engagement with the pot chucks 18 and 19. This mechanism may comprise a motor driven mechanism including a reversible electric motor 120 mounted on a bracket 121 which is adjustably mounted on the unit 32. The motor 120 is provided with a motor shaft 122 which supports a pulley 123. The pulley 123 is connected by a V-belt 124 with a pulley 125 mounted on a drive shaft 126 of a speed reducer unit 127. The speed reducer unit 127 may be of any of the well known speed reducer units now on the market. The speed reducer unit 127 is provided with a driven shaft 128 which is connected by a coupling 129 with a shaft 130 which is journalled in spaced anti-friction bearings 131 and 132 carried by the loader unit 32. The shaft 130 is provided with a pair of sprockets 133 and 134 which drive a pair of spaced parallel link chains 135 and 136. The lower ends of the chains 135 and 136 wrap around idler sprockets 137 and 138 respectively which are rotatably journalled in bearings 139 and 140 respectively carried by the loader unit 32. It will be readily apparent that rotary motion of the motor shaft 122 will be imparted through the mechanism just described to transmit motion to the link chains 135 and 136.

The link chains 135 and 136 are operatively connected in a manner to be hereinafter described to transmit a predetermined vertical motion to the slide 114 and also to impart a predetermined swinging movement to the arm 33 and the work engaging hook members 116 and 117. A cross head 141 is connected at its opposite ends to the link chains 135 and 139 in a manner illustrated in Fig. 10. The cross head 141 rotatably supports a bushing 142 at the opposite ends thereof in needle bearings 143. The bushing 142 is provided with a pair of spaced pins 144 and 145 (Fig. 10) which replace a pair of adjacent studs on the link chains 135 and 136. The pins 144 and 145 pass through a collar 146 which is secured thereto by a pair of set screws. The cross head 141 is provided with a downwardly extending arm 147 which is connected by a turnbuckle link 148 with an upwardly extending arm 149 of a bell crank lever 150. The bell crank lever is pivotally mounted on a rock shaft 155 which is supported by projecting bosses 156 and 157 formed integral with the ribs 114a and 114b respectively on the vertically movable slide 114. A second arm 158 of the bell crank lever 150 is connected by a stud 159 with the upper end of a turnbuckle link 160. The lower end of the link 160 is connected by a stud 161 with an arm 162 which together with the arm 33 forms a bell crank lever 163 which is pivotally supported by the stud 115. The turnbuckle 160 is provided to facilitate varying the length of the link, that is, the distance between the stud 159 and the stud 161 so as to vary the position of the work engaging hooks. By manipulation of the turnbuckle 148, the slide 114 together with the work-engaging hooks 34—35 may be vertically adjusted if desired. By manipulation of the turnbuckle link 160, the relative position of the pivoted arm 33 together with the work engaging hooks 34—35 may be varied to facilitate setting up the work loader unit.

Figure 8:
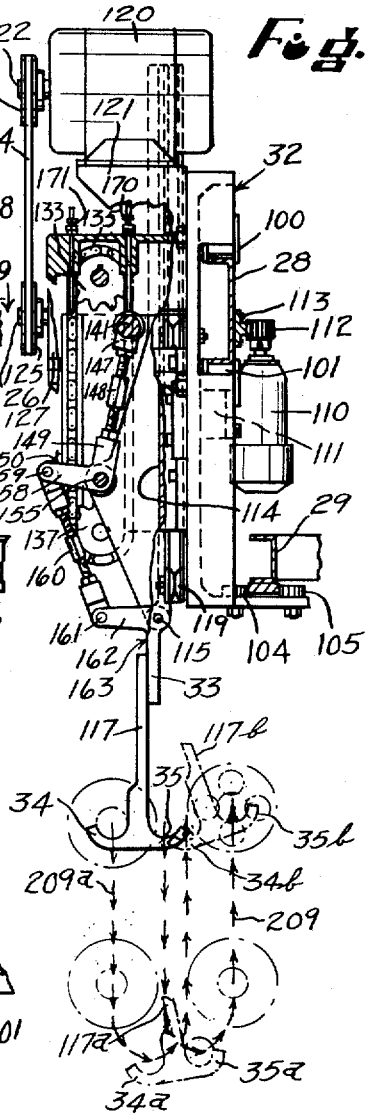
Fig. 8 is a right hand end elevation of the work transfer unit as shown in Fig. 7, having parts broken away and shown in section to show the operating mechanisms.
Figure 9:
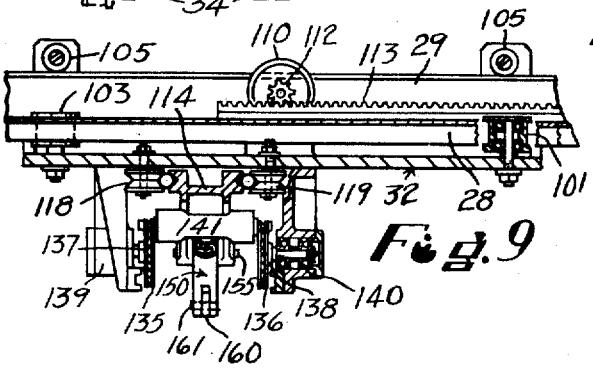
Fig. 9 is a fragmentary horizontal sectional view, taken approximately on the line 9—9 of Fig. 7, through the work transfer unit.
Figure 10:
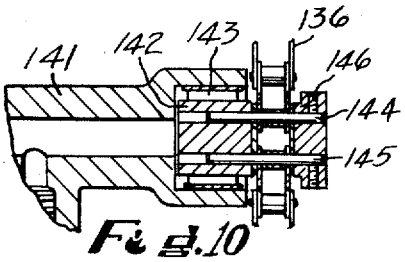
Fig. 10 is a fragmentary sectional view, on an enlarged scale, showing the driving connection between the link chain and the crosshead of the work transfer unit.

The electric motor 120 is preferably a reversible motor so that the link chains 135 and 136 together with the cross head 141 may be moved in either a clockwise or a counter-clockwise direction (Fig. 8). As shown in Fig. 8, the cross head 141 is shown in an uppermost position so that it raises a plunger 170 to actuate a limit switch LS10. When the motor 120 is started to actuate the work loader hooks, the link chains 135—136 start moving in a clockwise direction (Fig. 8) so that the cross head 141 travels downwardly in a U-shaped path and passes around the idler sprockets 137—138 and then moves upwardly until the cross head 141 engages and moves a plunger 171 upwardly to actuate a limit switch LS9.

During the downward movement of the cross head 141, a vertical movement is imparted to the vertical slide 114 to shift the loader hooks 34—35 downwardly into the position 34a—35a (Fig. 8) in a substantially vertical path for the purpose of depositing a ground crankshaft 27 on the roller chains 25—26. At the time the loader hooks reach position 34a—35a, the cross head 141 is about to start its travel about the idler sprockets 137—138 and due to the linkage previously described causes the loader hooks 34—35 to swing in a counter-clockwise direction and then to move vertically into position 34b—35b so that the hooks 35 engage main bearings of a crankshaft 27 on the chains 25—26 to pick up a shaft to be ground and to raise the hooks into positions 34b—35b.

When the work engaging hooks reach positions 34b—35b, a longitudinal traversing movement is imparted to the loader unit 34 to traverse it from a position directly over the roller chains 25—26 into a position directly over the grinding unit to facilitate loading a new shaft to be ground into the pot chucks 18—19 at each of the grinding stations.

In order to speed up the work loading and transferring cycle, each of the grinding stations No. 1, No. 2, No. 3 and No. 4 are provided with an intermediate station 175, 175a, 175b and 175c respectively which are fastened to the base 10. These intermediate station brackets are arranged in pairs, as shown in Fig. 3 to support spaced bearings on a crankshaft 27. Each of the intermediate station brackets are provided with V-shaped surfaces 176, 176a, 176b and 176c.

Figure 6:
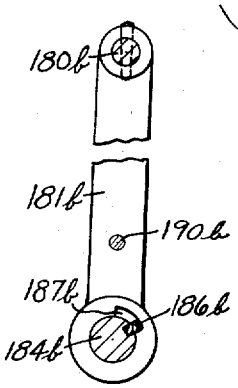
Fig. 6 is a fragmentary sectional view, on an enlarged scale, taken approximately on the line 6—6 of Fig. 3.
Figure 4:
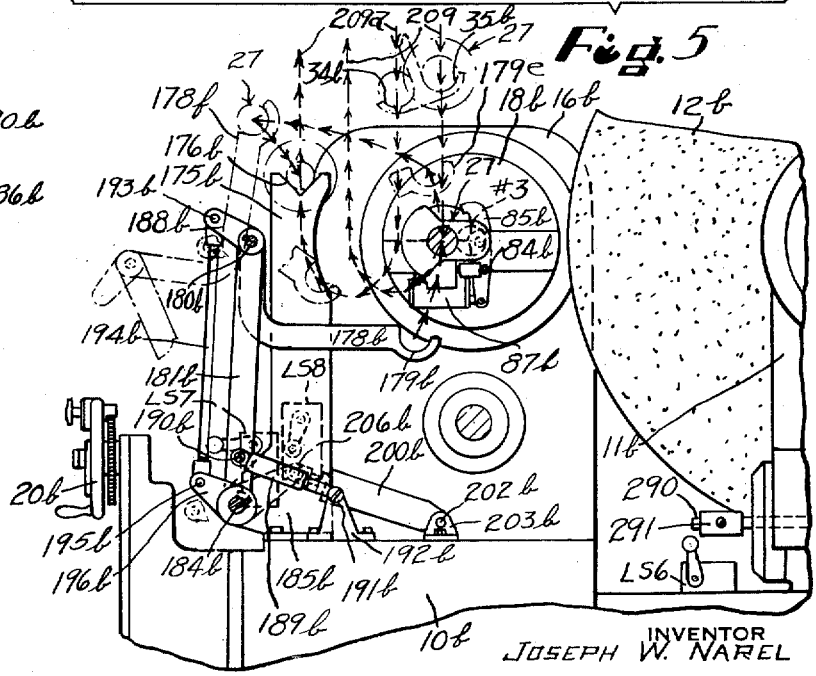
Fig. 4 is a fragmentary vertical sectional view, on an enlarged scale, taken approximately on the line 4—4 of Figs. 1 and 3 through the third grinding unit, showing the work supporting pot chuck and a portion of the work transfer and loading mechanism.
Figure 7:
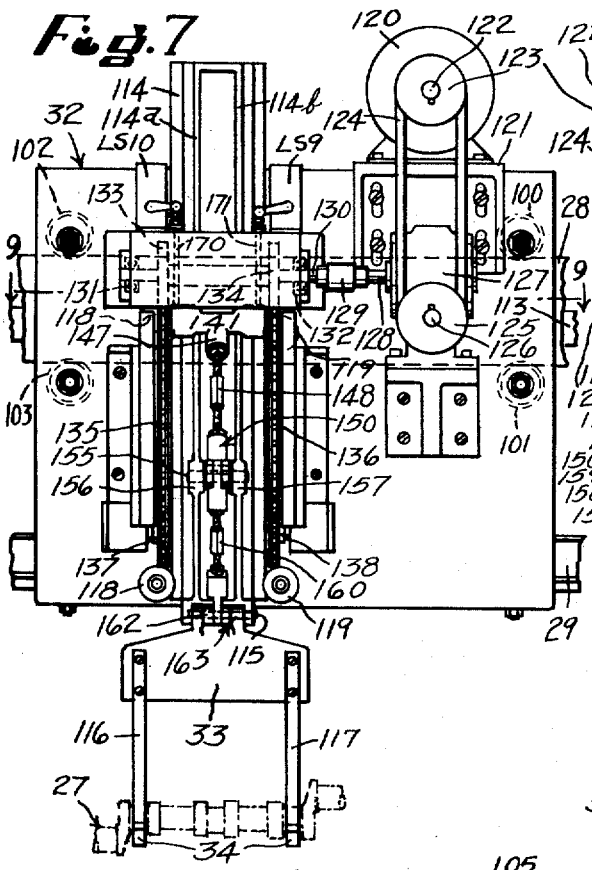
Fig. 7 is a front elevation, on an enlarged scale, of one of the work transfer units.

After a work piece has been ground to a predetermined extent, the work piece, such as, a crankshaft 27 is transferred from supporting engagement with the pot chucks 18—19 into supporting engagement with the V-shaped surfaces 176 of the intermediate station brackets 175. The transferring mechanism as illustrated in Figs. 3 and 4 (grinding unit No. 3) comprises a pair of spaced arms 177b and 178b each of which is provided with a half bearing surface 179b (Fig. 5). The transfer arms 177b and 178b are pivotally supported by a rock shaft 180b which is supported at the upper end of a pair of spaced arms 181b—182b (Fig. 3). As illustrated in Fig. 4 the arms 181b—182b are supported by a rock shaft 184b which is in turn supported by a pair of spaced bearing brackets 185b and 186b which are fixedly mounted on the base 10. The rock shaft 184b is provided with a lost motion connection between it and the arms 181b—182b comprising a key 186b fixedly mounted on the rock shaft 184b which rides in an elongated arcuate shaped keyway 187b (Fig. 6) so that the shaft 184 may be rotated several degrees before transmitting motion to the arms 181b—182b. The intermediate loader arms 177b—178b are fixedly pinned to the rock shaft 180b. A short arm 188b is keyed onto the rock shaft 180b so that the arms 177b—178b and the short arm 188b serve as a bell crank lever. A friction device, such as, a double acting shock absorber 189b is connected between a stud 190b on the arm 182b and a stud 191b which is carried by a bracket 192b (Fig. 4) fixedly mounted on the base 10. The arm 188b is connected by a stud 193b with a link 194b. The lower end of link 194b is connected by a stud 195b with an arm 196b which is keyed onto the rock shaft 184b.

An independent hydraulically operated mechanism (Fig. 18) is provided at each of the grinding units for actuating the intermediate loading mechanism above described comprising a cylinder 200 which contains a slidably mounted piston 201. The cylinder is pivotally supported by a stud 202b carried by a bracket 203b (Fig. [5] 4) which is fastened to the base 10. The piston 201 is connected to one end of a piston rod 204. The other end of the piston rod is connected by a stud 205 carried by an arm 206 which is keyed onto the rock shaft 184. When fluid under pressure is passed through a pipe 207 into a cylinder chamber 208, the piston 201 is moved toward the left (Fig. 18) which serves to rock the arm 206 in a counter-clockwise direction to transmit a corresponding motion to the rock shaft 184. The rotary motion of the rock shaft 184 (Fig. 4) causes a counter-clockwise movement of the arm 196b which is transmitted through the link 194b to impart a counter-clockwise movement to the arm 188b thereby moving the arms 177b—178b in a counterclockwise direction so that the half bearing surface 179b swings upwardly to engage a main bearing of a ground camshaft and swings it into the broken line position 179e. This movement is accomplished before the key 186b (Fig. 6) engages the left hand end of the keyway 187b (Fig. 6) so that during the initial movement of the piston 201, no motion is transmitted to the arms 181b—182b. Continued movement of the piston 201 toward the left, due to the lost motion being taken up between the key 186b and the keyway 187b serves to rock the arms 181b—182b in a counter-clockwise direction thereby swinging the arm 177b—178b into position 178f to position the ground crankshaft 27 in a position above the V-shaped supporting surface 176b of the intermediate station brackets 175b. During this movement of the piston fluid within a cylinder chamber 209 exhausts through a pipe 210.

When the flow of fluid under pressure is reversed fluid under pressure passing through the pipe 210 into the cylinder chamber 209 causes the piston 201 to move toward the right. During the initial movement of the piston toward the right, due to the lost motion connection shown in Fig. 6 no movement is transmitted to the arms 181b—182b which are held stationary by the shock absorber unit 189b. During this initial movement, the arms 177b—178b swing in a clockwise direction so as to deposit the ground crankshaft 27 in the V-shaped supporting surfaces 176b of the intermediate station brackets 175b. The numerals used in describing the intermediate loading apparatus and the loader units are identical for the parts at each of the grinding stations No. 1, No. 2, No. 3 and No. 4, a suffix "a" being added to the numeral for the parts shown in grinding Unit No. 2, a suffix "b" being added to the reference numeral for parts shown in connection with grinding unit No. 3 and a suffix "c" being added to designate corresponding parts for grinding unit 4.

During the movement of the piston 201 towards the right, the ground crankshaft is deposited in the intermediate stations, at which time the key 186b moves into engagement with the right hand surface of the keyway 187b (Fig. 6) so that continued movement of the piston 201 will swing the arms 181b—182b in a clockwise direction thereby shifting the arms 188b and 177b—178b into the full line positions illustrated in Fig. 4 so that they are ready for the next transferring operation.

Figure 18:
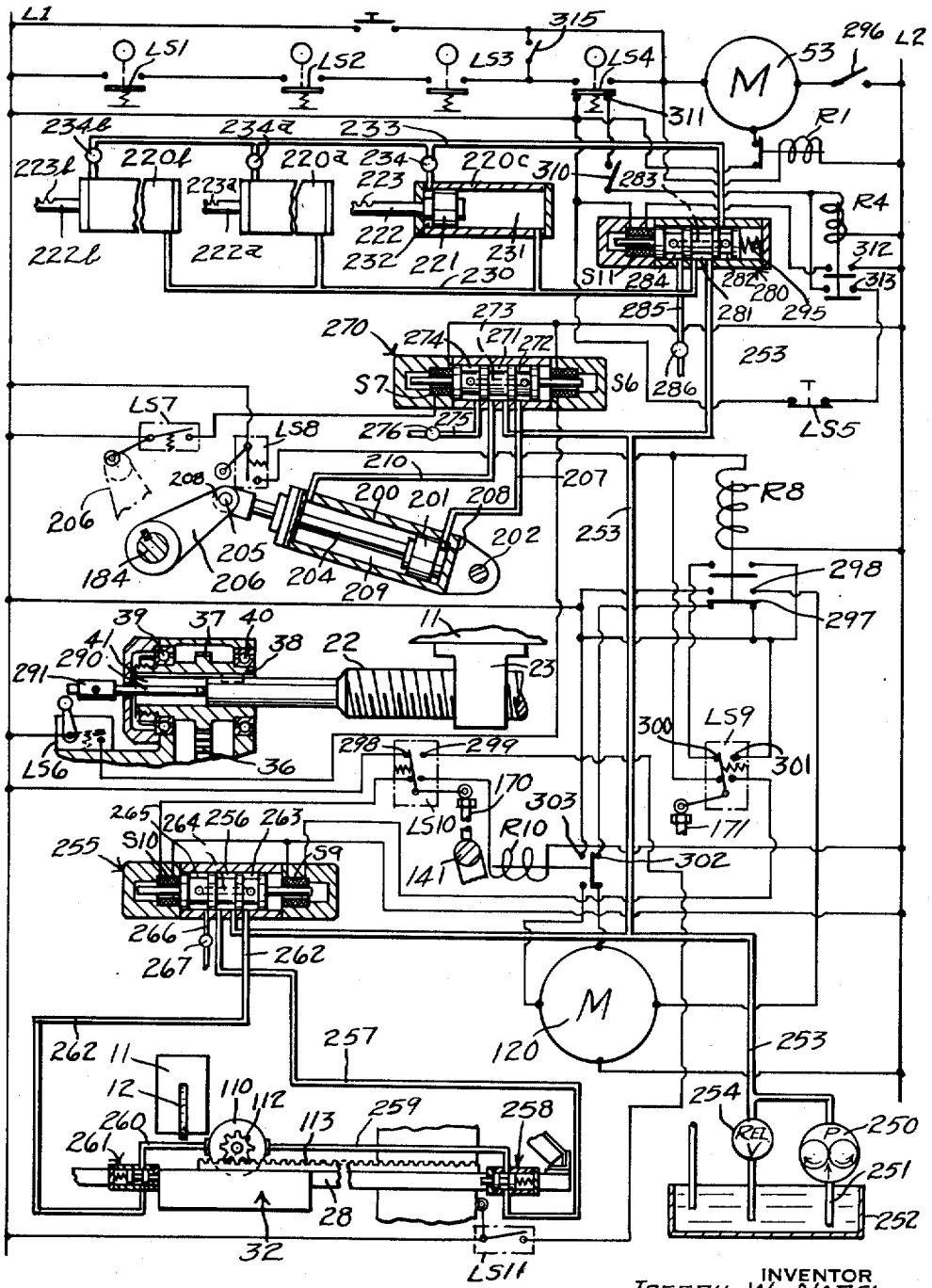
Fig. 18 is a combined electric and hydraulic diagram of the actuating mechanisms of the machine, and the controls therefor.

The stud 205 carried by the arm 206 is provided with a projecting enlarged cylindrical portion which is arranged in the path of the actuating rollers of a pair of limit switches LS7 and LS8 (Figs. 3 and 18). When the arm 206 is rocked in a counter-clockwise direction to transfer a work piece from the pot chuck to the intermediate station, the stud 208 rides idly over the actuating roller of the limit switch LS8 (Fig. 18) and engages the actuating roller of the limit switch LS7. During the return movement of the arm 206 in a clockwise direction, the stud 205 engages the actuating roller and momentarily closes the limit switch LS8.

The closing of the limit switch LS8 serves in a manner to be hereinafter described to render the loader unit 32 operative to cause a downward movement of the loader hooks 35b which travel in a substantially U-shaped path 209 (shown by arrows in Fig. 5) to deposit a crankshaft 27 in the pot chucks 18b—19b for the next grinding operation. During this movement, the loader hooks 34b travel through a U-shaped path 209a (indicated by arrows in Fig. 4) so that the loader hooks 34b on their upward movement pick up a ground crankshaft 27 from the intermediate station brackets 175b and raise it to a transfer position.

During the normal operation of this crank grinding apparatus, a crankshaft 27 is positioned adjacent to each one of the grinding units, that is, in positions 27, 27a, 27b and 27c (Fig. 1). A different crankpin is ground at each of the grinding units, that is, crankpin No. 1 is ground on grinding unit No. 1, crankpin No. 2 is ground on grinding unit No. 2, crankpin No. 3 is ground on grinding unit No. 3 and crankpin No. 4 is ground on grinding unit No. 4. These grinding operations are all simultaneously carried on. After a crankshaft has been ground at each of the grinding units, it is shifted onto the intermediate station above described, the loader units 32 then deposit a new shaft in the work supporting pot chucks, then pick up the ground shaft from the intermediate station and raise it to a transfer position. The loader units 32 are then traversed longitudinally along the supporting slideways 28 and 29 to position the loader unit directly over the conveyor chains 25—26. The ground crankshaft is then lowered into position on the chains 25—26 so that it is supported by the next set of V-supporting surfaces 75 and 76. A crankshaft ground on grinding unit No. 1 is deposited on the V-shaped supports 75aa and 76aa on the chains 25—26 after which the loader hooks pick up a crankshaft to be ground which is supported on the V-shaped surfaces 75a and 76a and raise the shaft to a transfer position after which the loader unit 32 is traversed into a position so that the new shaft to be ground is located directly over the grinding unit ready for the next loading operation. This same transferring operation takes place at each of the grinding units simultaneously while the grinding units are performing a grinding operation on another crankshaft.

Figure 13:
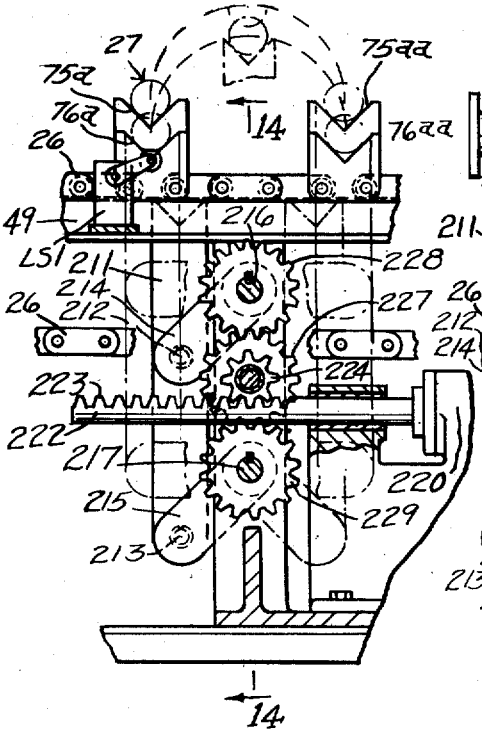
Fig. 13 is a fragmentary vertical longitudinal sectional view on an enlarged scale of a portion of the conveyor mechanism showing a mechanism arranged to facilitate by-passing a grinding station.

If it becomes necessary to shut down any one of the grinding units for adjustment or repair, it is desirable that the remaining units remain operative so that all of the other crankpins on the shaft may be ground. In case any unit is shut down, it is desirable to provide a by-pass mechanism whereby the crankshaft 27 may be shifted directly from the V-surfaces 75a—76a onto the V-supporting surfaces 75aa and 76aa in order to facilitate an indexing movement of the chains 25—26. A suitable by-pass mechanism is provided comprising a pair of vertically arranged arms 211 each having a V-shaped surface at its upper end for engaging spaced main bearings of a crankshaft to be by-passed. These arms 211 are arranged in pairs, one on each side of the conveyor chains 25—26 as shown in Figs. 13 and 14. Each of the arms 211 are supported by a pair of spaced studs 212 and 213 which are carried by crank arms 214 and 215. The crank arms 214 and 215 are fixedly keyed onto the opposite ends of a pair of rotatable shafts 216 and 217 respectively which are journalled in suitable bearings carried by the frame of the machine. A similar pair of crank arms 214 and 215 are fixedly keyed on the other ends of the shafts 216 and 217. A by-pass mechanism is provided adjacent to grinding units No. 1, No. 2 and No. 3. Each of these by-pass units are identical in construction with that shown and described above and consequently will not be described in detail. The actuating mechanisms for each of the by-pass mechanisms consists of the cylinders 220, 220a and 220b each containing a slidably mounted piston 221. A piston rod 222, 222a and 222b is fixedly mounted at one end of each of the pistons 221 respectively. The piston rods 222, 222a and 222b are each provided with a rack bar 223, 223a and 223b, respectively, which mesh with a gear 224. The gear 224 is rotatably supported on a stationary shaft 225 carried by a frame 226. A gear 227 is formed integral with the gear 224 and meshes with a pair of gears 228 and 229 which are fixedly mounted on the shafts 216 and 217 respectively. It will be readily apparent from the foregoing disclosure that movement of the rack bar 223 toward the left will be imparted through the crank arms 214 and 215 to cause the V-shaped surfaces 211 on the upper ends of the arms to move through a semi-circular path as indicated in dotted lines in Fig. 13 to pick up a crankshaft 27 from the V-shaped supporting surfaces 75a and 76a and to swing the shaft onto the V-shaped surfaces 75aa and 76aa so that it is ready for the next indexing movement of the chains 25—26, without being transferred to and from the grinding unit which has been shut down.

When a crankshaft is by-passed, it serves to allow either limit switch LS1, LS2, or LS3 to close to facilitate starting the next indexing movement of the chains 25—26 after the remaining limit switches are closed. The by-pass arms 211, after by-passing a crankshaft, remain in this position until the next indexing movement of the chains 25—26. During the next indexing movement of the chains 25—26, a crankshaft carried by the chains engages the actuating roller and opens a limit switch LS5 to deenergize a solenoid S11, thereby releasing the compression of a spring 295 to return the valve to the position illustrated in Fig. 18. In the position of the valve 270, fluid under pressure passed to the cylinders 200 is reversed thereby returning the by-pass mechanism to its initial position.

Fluid under pressure is conveyed through a pipe 230 into a cylinder chamber 231 at the right hand end of each of the cylinders 220, 220a, and 220b respectively to cause the pistons 221 to move toward the left, during which movement fluid within a cylinder chamber 232 at the left hand end of each of the cylinders may exhaust through a pipe 233. In order to facilitate independent control of each of the by-pass units, a control valve 234, 234a and 234b is interposed between the pipe 233 and the cylinders 220, 220a and 220b respectively. These valves 234, 234a and 234b are normally closed to render the by-pass units inoperative. If it becomes necessary to operate any one of the by-pass units, the control valve, that is, either 234, 234a or 234b may be opened to render the desired by-pass unit operative. With one of the valves opened, the by-pass unit operates automatically in timed relation with the other operations of the machine.

In case all of the grinding units are operative so that each of the crankpins are ground as they pass through grinding units No. 1, No. 2, No. 3 and No. 4, the loader unit 32c will transfer the ground crankshaft from grinding unit No. 4 and the loader hooks 34 will deposit the finished ground crankshaft on a pair of spaced guide rails 240 where they are discharged from the machine.

In case any one of the grinding units is shut down for any reason, the crankshafts being ground will progress through the remaining grinding units and will approach the right hand end of the machine as shown in Figs. 11 and 12 with one of the crankpins not ground. With the machines in this condition, it is desirable to drop the unfinished crankshafts from grinding unit No. 4 onto the conveyor chains 25—26 where they may be conveyed to an independent stand-by crankpin grinding machine where the unground crankpin may be ground to the desired and predetermined extent. In order to facilitate conveying the crankshaft onto the chain, the rails 240 are preferably pivotally mounted by studs 241 onto a discharge chute 242 so that the rails 240 may be swung in a clockwise direction into position 240a (Fig. 12) so that when the loader unit 32c transfers an unfinished crankshaft 27 from the grinding unit No. 4 into a position directly over the conveyor chains 25—26, the hooks 34 will deposit the unfinished crankshaft 27 onto the next set of V-shaped supporting surfaces 75dd and 76dd so that on the next indexing movement of the chains 25—26 the unfinished shaft may be indexed from the chain onto a discharge chute (not shown). The crankshaft may then be taken from the discharge chute, and the pin which has not been ground may be ground in an independent stand-by machine (not shown).

In case it becomes necessary to shut down grinding unit No. 4, a manually operable switch 315 is closed to render the limit switch LS4 inoperative, so that upon closing all of the other limit switches LS1, LS2 and LS3, the circuit is closed to start the motor 53 thereby indexing the roller chains 25—26.

A hydraulic system is provided for conveying fluid under pressure to the various operating mechanisms of the machine. This system may comprise a motor driven fluid pump 250 which draws fluid through a pipe 251 from a reservoir 252 and conveys fluid under pressure to a pipe 253. A pressure relief valve 254 is provided in the pipe line 253 to facilitate by-passing excess fluid under pressure directly to the reservoir 252 so as to maintain a substantially uniform pressure within the system. Pipe 253 conveys fluid under pressure to a solenoid actuated valve 255 which is arranged to control the flow of fluid to the loader unit traversing motor 110. The valve 255 is a piston type valve which is moved from one end position to the other by a pair of solenoids S9 and S10. In the position illustrated in Fig. 18 fluid from the pipe 253 enters a valve chamber 256 and passes through a pipe 257, through a slow-down valve 258, through a pipe 259 to the motor 110. Fluid may exhaust from the other side of the motor 110 through a pipe 260, through a slow-down valve 261, through a pipe 262, into a valve chamber 263, through a central passage 264 in the slidable valve member of the valve 255 into a valve chamber 265 and through an exhaust pipe 266 and a throttle valve 267 into the reservoir 252. The aperture of the throttle valve 267 serves to control the traversing speed of the loader unit 32 in either direction.

As the loader unit 32 approaches the end of its traversing stroke in either direction, the loader unit 32 actuates one or the other of the slow-down valves 258 or 261 to partially cut off the flow of fluid therethrough to slow down the longitudinal traversing speed of the unit 32 before it reaches the end of its stroke.

Fluid under pressure passing through the pipe 253 is also conveyed to a solenoid actuated control valve 270 which is arranged to control the flow of fluid to each of the cylinders 200 for actuating each of the transfer mechanisms for transferring a ground piece of work from the pot chucks to the intermediate stations. As illustrated in Fig. 18 fluid under pressure from the pipe 253 enters a valve chamber 271 and passes through the pipe 210 into the cylinder chamber 209 to move the pistons 201 toward the right. During this movement fluid may exhaust from the cylinder chamber 208, through a pipe 207 into a valve chamber 272, through a central passage 273, into valve chamber 274 and through an exhaust pipe 275 and a throttle valve 276 into the reservoir 252. By manipulation of the throttle valve 276, the speed of movement of the piston 201 and the intermediate transfer mechanism may be regulated as desired.

The pipe 253 also conveys fluid under pressure to a control valve 280 which controls the flow of fluid to and the exhaust of fluid from the by-pass mechanism cylinders 220, 220a and 220b. In the position of the valve 280 as illustrated, fluid under pressure passing through the pipe 253 enters a valve chamber 281, and passes through the pipe 230 to the right hand end of each of the cylinders 220, 220a and 220b to cause a movement of the pistons 221 toward the left provided any one of the valves 234, 234a or 234b are opened. Fluid from the left hand end chamber 232 of the cylinders 220 may exhaust through the pipe 233 into a valve chamber 282, through a central passage 283 into a valve chamber 284 and exhausts through a pipe 285 and a throttle valve 286 into the reservoir 252. The rate of movement of the pistons 221 in either direction may be regulated by manipulation of the valve 286 to control the rate of movement of the by-pass mechanism.

The operation of the crankshaft grinding machine will be readily apparent from the foregoing disclosure. When the grinding machine is first started up, a crankshaft 27 is placed on the conveyor chains 25—26 at the left hand end thereof (Fig. 1). Due to the fact that there are no crankshafts on the conveyor chains 25—26 adjacent to grinding units No. 1, No. 2, No. 3 and No. 4, the limit switches LS1, LS2, LS3 and LS4 are closed. A manually operable switch 296 is then closed which completes a circuit to start the chain driving motor 53. The motor 53 is equipped with a built-in braking circuit which is controlled by a relay switch R1. When the switch 296 is closed to start the motor 53, a circuit is completed to energize relay switch R1 to release the motor brake and at the same time to start the motor 53. The roller chains 25—26 start moving toward the right (Fig. 1) which movement continues until the crankshaft 27 is carried by chains 25—26 actuates the limit switch LS1 when the shaft reaches a position adjacent to grinding unit No. 1. The opening of limit switch LS1 stops the motor 53, deenergizes relay switch R1 to brake the motor with the crankshaft to be ground in this position.

All of the grinding units No. 1, No. 2, No. 3 and No. 4 are then started in a manner similar to that disclosed in the [pending application Serial No. 434,484 filed June 4, 1954 by H. A. Silven and S. S. Mader] *patent to Silven et al. No. 2,780,895*. There are no crankshafts in any of the grinding units and the grinding units go idly through a normal cycle. When the wheel slide 11 of grinder unit No. 1 moves rearwardly at the end of a feeding cycle, an adjustable sleeve 291 on a rod 290 carried by the feed screw 22 momentarily closes the limit switch LS6 to energize a solenoid S6 to shift the valve 270 into a right hand end position so that fluid under pressure is passed through the pipe 207 to actuate the transferring mechanism for moving a crankshaft to the intermediate station. There is no shaft in the pot chucks so this mechanism goes through an idle cycle. As the intermediate loading mechanism approaches a position for depositing at the intermediate station, the limit switch LS7 is closed to energize a solenoid S7 to shift the valve 270 into a left hand end position (Fig. 18) thereby reversing the flow of fluid to the cylinder 200 so as to return the intermediate loading mechanism to the full line position as indicated in Fig. 4. As the intermediate loading mechanism approaches this position, the limit switch LS8 is momentarily closed to energize a relay switch R8 to open contacts 297 to release the brake of motor 120 and to close contacts 298 to start the motor 120 so as to cause a downward movement of the loader unit crosshead 141 (Fig. 18). As the crosshead 141 starts its downward movement (Fig. 18), the plunger 170 moves downwardly thereby actuating limit switch LS10 to open contacts 298 and to close contacts 299. The loader hooks 35—34 move downwardly (the loader hooks now being empty) from position 35b to position 35a to a position aligned with the pot chucks 18—19 of grinding unit No. 1. Continued movement of the loader hooks 35—34 swings the loader hooks 34 through a path normally to pick up crankshaft from the intermediate station brackets 175 and to raise the hooks into full line positions 35—34 (Fig. 8). As the hooks reach this position, the cross head 141 causes an upward movement of plunger 171 to actuate the limit switch LS9 to open contacts 300 and to close contacts 301. The opening of contacts 300 breaks a holding circuit to deenergize relay switch R8 which serves to open contacts 298 to stop the motor 120 and at the same time to close contacts 297 to brake and stop the motor 120.

The closing of contacts 301 of limit switch LS9 serves to energize a solenoid S9 to shift valve 255 toward the right so that fluid under pressure is passed through the pipe 262, through the slow-down valve 261, the pipe 260 to start the fluid motor 110 to start a traversing movement of the loader head 32 (Fig. 18) toward the right. As the loader unit 32 approaches this position, the slow-down valve 258 is actuated to slow down the motor and stop the motor 110. At the same time the loader unit 32 closes the limit switch LS11 which completes a circuit through the previously closed contacts 299 of limit switch LS10 to energize a relay switch R10. The energizing of relay switch R10 serves to open contacts 302 and to close contacts 303. The opening of contacts 302 releases the brake on the motor 120 and the closing of contacts 303 starts the motor 120 in the reverse direction. The loader hooks 35—34 will start a downward movement. The loader hooks 34 would normally be loaded with a ground crankshaft. The hooks move downwardly into position 34a normally to deposit a ground crankshaft on the V-shaft blocks 75aa and 76aa of the chain 50 ready for the next indexing movement of the chains 25—26. During the continued movement of loader hooks 35—34 in a counterclockwise direction (Fig. 8) the hooks 35 pick up a crankshaft 27 from the V-blocks 75a—76a (Fig. 12) and raise it to an uppermost position with the loader hooks in positions 35b—34b. As the loader hooks 35—34 pick up a crankshaft 27 from the chains 25—26, the limit switch LS1 is closed thereby completing a circuit to again release the brake and start the conveyor motor 53 to index the chains 25—26 so that the next shaft 27 to be ground is positioned adjacent to grinder unit No. 1. As the shaft approaches a position adjacent to grinder unit No. 1, the new crankshaft again opens the limit switch LS1 to stop the conveyor motor 53. As the cross head 141 moves upwardly to position the hooks 35—34 in broken line positions 35b—34b, the crosshead 141 moves the plunger 170 upwardly to actuate the limit switch LS10 opening the contacts 299 and closing the contacts 298. The opening of contacts 299 serves to deenergize relay switch R10 to stop and brake the motor 120. The closing of the contacts 298 energizes a solenoid S10 to shift the valve 255 into a left hand end position so that fluid under pressure is passed through the pipe 257, through the slow-down valve 258, through the pipe 259 to start the fluid motor 110 in the reverse direction to traverse the loader unit 32 toward the left (Fig. 18). This movement of the loader unit conveys a crankshaft to be ground supported by loader hooks 35 to a position directly over the pot chucks 18—19 of grinding unit No. 1. As the loader unit 32 approaches the left hand end of its stroke (Fig. 18), the loader unit engages and actuates the slow-down valve 261 so as to slow down and stop the loader unit 32 in a loading position. The pressure remains upon the fluid motor 110 to hold the loader unit in this position.

This actuation of the loader unit takes place during the grinding cycle of grinder unit No. 1. The grinder No. 1 goes through an idle grinding cycle, there being no crankshaft supported by the pot chucks. After this idle grinding cycle, as the wheel slide 11 moves rearwardly to an inoperative position, the limit switch LS6 is momentarily closed to initiate an actuation of the intermediate loading mechanism, there being no crankshaft in the pot chucks this mechanism goes through an idle cycle. After the intermediate loader unit completes its idle cycle, the limit switch LS8 is momentarily closed to energize relay switch R8 to start the loader unit 32 in a manner above described so as to load the crankshaft 27 supported by the hooks 35 into the pot chucks 18—19 in grinder unit No. 1.

The crankshaft 27 supported by the pot chucks 18—19 is then rotated and crankpin No. 1 is ground to the desired and predetermined extent. During this grinding operation, the loader 32 moves toward the right (Fig. 18) to a position directly over the roller chains 25—26 and the loader hooks operate in a manner previously described so that hooks 34, if loaded with a crankshaft from the intermediate station, would deposit a ground shaft onto the V supports 75aa and 76aa. Continued movement of the hooks serves to pick up the next crankshaft from the V surfaces 75a and 76a and to raise it into a transfer position, after which the loader 32 is again moved toward the left (Fig. 18) to a position directly above the pot chucks 18—19.

After the first shaft has been ground at grinding unit No. 1, the arms 177—178 swing upwardly to pick up the ground shaft from the pot chucks 18—19 in a manner previously described and to deposit the shaft into the intermediate station brackets 175. At this time the hooks 35b move downwardly to position 35a (Fig. 8) to deposit a new shaft into the pot chucks 18—19. Continued movement of the hooks 35—34 serves to swing the hooks 34 so as to pick up the ground shaft from the intermediate station bracket 175 and to raise it to a transfer position. The grinding operation on the next shaft then proceeds during which, the loader 32 returns to a position directly over the roller chains 25—26 to deposit a ground shaft thereon and to pick up a new shaft to be ground. The new shaft is then raised to a transfer position as above described and transferred to a position directly over the pot chucks 18—19.

When a shaft is picked up from the roller chains 25—26, the limit switch LS1 is closed to start the next indexing movement of the chains 25—26 which carries a new shaft into position adjacent to grinding unit No. 1, and at the same time carries a ground shaft into a position adjacent to grinding unit No. 2. Grinding unit No. 2 together with the associate loader mechanism and intermediate station mechanism operate identically with that just described in connection with grinding unit No. 1. This cycle of operation is continued until crankshafts are simultaneously positioned in all of the grinding units No. 1, No. 2, No. 3 and No. 4, after which a different crankpin is simultaneously ground at each unit. Each time the loader units 32, 32a, 32b and 32c simultaneously deposit a ground crankshaft on the chains 25—26 and pick up a new crankshaft to be ground, the limit switches LS1, LS2, LS3 and LS4 are closed thereby releasing the brake and starting the conveyor chain driving motor 53 to index the chains to present the next shaft adjacent to the grinding units No. 1, No. 2, No. 3 and No. 4. All of the grinding units perform simultaneous grinding operations on different crankshafts 27, unit No. 1 grinding crankpin No. 1, unit No. 2 grinding crankpin No. 2, unit No. 3 grinding crankpin No. 3 and unit No. 4 grinding crankpin No. 4 so that after a crankshaft passes through each of the four grinding units, all of the crankpins are ground and it is deposited onto the discharge rails 240 and onto the discharge station 242.

In case it becomes necessary to shut down any one of the grinding units No. 1, No. 2, No. 3 for adjustment or repair, a manually operable switch 310 is closed and one of the valves 234, 234a or 234b is opened. Each time the limit switch LS4 is actuated by a crankshaft, the set of contactors 311 are closed to energize a relay switch R4. The closing of contacts 312 of relay switch R4 completes a circuit to energize solenoid S11 to shift the valve 280 toward the right against the compression of the spring 295 so that fluid under pressure is passed through the pipe 233 to one of the cylinders 220, depending upon which one of the valves 234 is opened to cause an actuation of the by-pass mechanism previously described. The energization of the relay switch R4 also closes a set of contactors 313 which sets up a holding circuit through a limit switch LS5 to maintain the relay switch R4 energized. The by-pass mechanism by-passes the unground work piece onto the next set of V supports 75aa and 76aa and the parts of the by-pass mechanism remain in this position until the next indexing movement of the conveyor chains 25—26. During the next indexing movement a crankshaft 27 on the chains 25—26 engages and opens the limit switch LS5 to break the holding circuit thereby deenergizing the relay switch R4 to deenergize the solenoid S11 so that the released compression of the spring 295 returns the valve 280 into a left hand end position, as illustrated in Fig. 18. When the valve is in this position fluid under pressure passes through the pipe 230 to reverse the direction of movement of the pistons 221 to return the by-pass mechanism to its initial position.

In case station No. 4 is shut down for any reason, no by-pass mechanism is provided. When a crankshaft is moved into position adjacent to station 4, the limit switch LS4 is opened, a manually operable switch 315 is previously closed. With the manually operable switch 315 closed, when limit switches LS1, LS2 and LS3 are closed by a crankshaft, a circuit will be completed to energize the relay switch R1 to release the motor brake and at the same time to start the motor 53 to cause an indexing movement of the conveyor chains 25—26.

Whenever any one of the grinding units is shut down, the entire unit including a loader mechanism and the mechanism for transferring a shaft to the intermediate station are rendered inoperative.

Whenever any one of the grinding units may be temporarily shut down, the rails 240 are swung into an inoperative position 240a (Fig. 12) so that an unfinished crankshaft leaving a position opposite or adjacent to grinding unit No. 4 continues to be indexed with the chains 25—26 to a discharge chute (not shown). During normal operation when all of the grinding units are operative, a crankshaft discharged from grinding station No. 4 is deposited on the rails 240 into the discharge chute 242 as a finished ground shaft with all pins ground to the desired extent.

The operation of the machine may be started in a manner different than that previously described, that is, if desired crankshafts 27 may be manually positioned on the chains 25—26 in positions 27, 27a, 27b and 27c adjacent to grinding units No. 1, No. 2, No. 3 and No. 4. Crankshafts may also be loaded manually into the pot chucks 18—19 at each of the grinding units and a new chankshaft to be ground manually positioned on the loader hooks 35 on each of the loader units 32, 32a, 32b and 32c, respectively. After this manual loading operation, the machine may be started by closing the manually operable switch 296 after which each of the grinding units No. 1, No. 2, No. 3 and No. 4 are started to grind the crankshafts supported in the respective pot chucks 18—19. The functioning of the transferring mechanism for transferring the ground crankshafts to the intermediate station, the loader units for transferring the crankshafts to and from the pot chucks and from the intermediate station to the conveyor chain, together with the indexing of the conveyor chains 25—26 are operated identical with that perviously described. All of the crankpins are successively ground as the crankshaft is successively conveyed to the grinding units No. 1, No. 2, No. 3 and No. 4. Crankpin No. 1 is ground on grinding unit No. 1, crankpin No. 2 is ground on grinding unit No. 2, crankpin No. 3 is ground on grinding unit No. 3 and crankpin No. 4 is ground on grinding unit No. 4.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a crankshaft grinding machine having a base, a pair of spaced axially aligned synchronously rotatable pot chucks thereon for supporting opposite ends of a crankshaft to be ground and a transversely movable rotatable grinding wheel on said base, and a work loading mechanism including an indexable loading mechanism successively to position crankshafts to be ground into a predetermined position adjacent to the grinding machine, a work loader on said machine arranged to transfer crankshafts from the loading mechanism into the pot chucks, an intermediate station on said machine, an intermediate loader mechanism automatically to transfer ground crankshaft from the pot chucks to said intermediate station, and means on said work loader to pick up a crankshaft from the intermediate station and to transfer it onto said loading mechanism.

2. In a crankshaft grinding machine having a plurality of spaced parallel grinding units, each unit including a base, a pair of spaced axially aligned synchronously rotatable pot chucks on each of said bases for supporting opposite ends of a crankshaft to be ground and a transversely moveable rotatable grinding wheel on each of said bases, a longitudinally indexable work loading mechanism successively to index a plurality of crankshafts to be ground into predetermined loading positions adjacent to each of said grinding units, an independent work loader on each of said units arranged to transfer crankshafts from the loading mechanism into the pot chucks, an intermediate work station on each unit, an intermediate loader mechanism on each unit automatically to transfer ground crankshafts from the pot chucks to said intermediate station, and means on each of said work loaders to transfer a ground crankshaft from said intermediate station onto said loading mechanism.

3. In a crankshaft grinding machine as claimed in claim 2, in combination with the parts and features therein specified of a plurality of spaced work supporting brackets on said loader mechanism to support crankshafts to be ground in the same predetermined indexed position adjacent to each grinding unit, a work supporting bearing surface on each of said pot chucks to support the opposite ends of a crankshaft to be ground, said bearings being located in different positions on each pair of pot chucks precisely to position a predetermined crankpin to be ground in axial alignment with the axis of rotation of said pot chucks, a work locating surface on one pot chuck of each pair, and means cooperating therewith precisely to position and hold a crankshaft against said surface, said pot chucks being arranged so that a crankshaft to be ground may be transferred vertically from the loading mechanism by the work loader into a transfer position, then transferred and lowered vertically into the pot chucks.

4. In a crankshaft grinding machine as claimed in claim 2, in combination with the parts and features therein specified of a motor to index said loading mechanism, means including a plurality of spaced limit switches connected in series to control said motor, one of said switches being located adjacent to each grinding unit to facilitate stopping said loading mechanism with the crankshaft to be ground positioned adjacent to each of said grinding units, and a transversely movable loader on each of said units arranged to transfer crankshafts to be ground into the grinding unit for a grinding operation and to transfer ground crankshafts from said unit onto said loading mechanism after a grinding operation has been completed.

5. In a crankshaft grinding machine, as claimed in claim 2, in combination with the parts and features therein specified of means including a motor to index said loading mechanism, means including a plurality of spaced limit switches connected in series to control said motor, one of said switches being located adjacent to each grinding unit to facilitate stopping said loading mechanism with a crankshaft to be ground positioned adjacent to each of the said grinding units, a transversely movable loader on each of said units arranged to transfer crankshafts to be ground from the loading mechanism into the pot chucks, and to transfer ground crankshafts from the intermediate station onto said loading mechanism.

6. In a crankshaft grinding machine as claimed in claim 2, in combination with the parts and features therein specified of a transversely movable independent work loader on each of said grinding units, a pair of spaced vertically movable work engaging hooks on each of said loaders, means including a motor to traverse said loader transversely in either direction, means including a motor to move said hooks vertically through a substantially U-shaped path in either direction, means including a motor to actuate said intermediate loader mechanism, means actuated by and in timed relation with movement of the wheel slide to an inoperative position after a grinding operation to start latter motor to actuate the intermediate loader so as to transfer a ground crankshaft from the pot chucks to the intermediate station, means actuated by and in timed relation with the intermediate loader to start the work loader motor in one direction to move said hooks through a U-shaped path in one direction to deposit a crankshaft to be ground in said pot chucks and to pick up a ground crankshaft from the intermediate station and to raise it to a transfer position, means actuated by and in timed relation with the work loader to start the work loader traverse motor to traverse the work loader to a position over the loading mechanism, and means actuated by and in timed relation with longitudinal movement of the work loader to start the work loader motor in the reverse direction so that said hooks move through a U-shaped path in the reverse direction to deposit a ground crankshaft on the loading mechanism and to pick up a new crankshaft to be ground.

7. In a crankshaft grinding machine, as claimed in claim 2, in combination with the parts and features therewith specified of a transversely movable independent work loader on each of said grinding units, a pair of spaced vertically movable work engaging hooks on each of said loaders, means including a motor to traverse said work loader transversely in either direction, means including a motor to move said hooks vertically through a substantially U-shaped path in either direction, means including a motor to actuate said intermediate loader mechanism, a limit switch actuated by and in timed relation with movement of the wheel slide to an inoperative position after a grinding operation to start said latter motor to actuate the intermediate loader to transfer a ground crankshaft from the pot chucks to the intermediate station, a limit switch actuated by and in timed relation with the intermediate loader to start said work loader motor in one direction to move said hooks through a U-shaped path to deposit a crankshaft to be ground in said pot chucks and to pick up a ground crankshaft from the intermediate station and to raise it to a transfer position, a limit switch actuated by and in timed relation with the work loader to start the work loader traverse motor to traverse the work loader to a position over the loading mechanism, and means including a limit switch actuated by and in timed relation with longitudinal movement of the work loader to start the work loader motor in the reverse direction so that said hooks move through a U-shaped path in the reverse direction to deposit a ground crankshaft on the loading mechanism and to pick up a new crankshaft to be ground.

8. In a crankshaft grinding machine, as claimed in claim 2, in combination with the parts and features therein specified of a transversely movable work loader on each of said grinding units, a pair of spaced vertically movable work engaging hooks on each of said loaders, means including a reversible motor to traverse said work loader transversely in either direction, means including a reversible motor to move said hooks vertically through a substantially U-shaped path in either direction, means including a reversible motor to actuate said intermediate loader mechanism, means actuated by and in timed relation with movement of the wheel slide to an inoperative position after a grinding operation to start said latter motor to actuate the intermediate loader to transfer a ground crankshaft from the pot chucks to the intermediate station, means actuated by and in timed relation with the intermediate loader to start said work loader motor in one direction to move said hooks through a U-shaped path in one direction to deposit a crankshaft in said pot chucks and to pick up a ground crankshaft from the intermediate station and raise it to a transfer position, means acutated by and in timed relation with the work loader to start the work loader traversing motor to traverse the work loader to a position over the loading mechanism, means actuated by and in timed relation with longitudinal movement of the work loader to start the work loader motor in the reverse direction so that said hooks move through a substantially U-shaped path in the reverse direction to deposit a ground crankshaft on the loader mechanism and to pick up a new crankshaft to be ground, and means actuated thereby to start said loading mechanism motor to index a plurality of crankshafts into positions adjacent to each of said grinding units.

9. In a crankshaft grinding machine having a plurality of spaced parallel grinding units, each unit including a pair of spaced axially aligned synchronously rotatable pot chucks to support opposite ends of a crankshaft to be ground and a transversely movable rotatable grinding wheel, a longitudinally indexable work loading mechnism successively to index crankshafts to be ground into predetermined loading positions adjacent to each grinding unit, an independent work loader including spaced movable work pick-up members on each of said units arranged to transfer crankshafts from the loading mechanism into said pot chucks, an intermediate work station on each unit, an intermediate loader mechanism on each unit automatically to transfer ground crankshafts from the pot chucks to said intermediate station, and means including a second pair of spaced work pick-up members on each of said work loaders arranged to [pick-up] *pick up* a crankshaft from the intermediate station and to transfer [in] *it* onto the loading mechanism for indexing to the next grinding unit.

10. In a crackshaft grinding machine having a pair of spaced aligned synchronously rotatable pot chucks and a transversely movable rotatable grinding wheel, a work loading mechanism automatically to load successive crankshafts to be ground in substantially the same direction into successive pairs of pot chucks, a work supporting bearing surface on each of said pot chucks to support the opposite ends of a crankshaft to be ground, said bearing surface being located on said pot chucks so as to precisely position the axis of a predetermined crankpin to be ground relative to the axis of rotation of said pot chucks, a work locating surface on each of said pot chucks engaged by a locating surface on a crankshaft to be ground, and means cooperating therewith to maintain a portion of a crankshaft thereagainst precisely to orient a crankshaft in said pot chucks with the crankpin to be ground positioned in axial alignment with the axis of rotation of said pot chucks, and means including a clamping jaw on each of said pot chucks to clamp the crankshaft in said pot chucks during a grinding operation.

11. In a crankshaft grinding machine having a pair of spaced axially aligned synchronously rotatable pot chucks, a work supporting bearing surface on each of said pot chucks which is offset relative to the axis of rotation of the pot chucks to support the opposite ends of a crankshaft to be ground with the axis of the crankpin to be ground approximately aligned with the axis of rotation of the pot chucks, a work locating surface on one of said pot chucks engageable by a locating surface on the crankshaft to be ground, and means cooperating therewith precisely to orient the crankshaft so as to position the locating surface on said crankshaft against said surface precisely to position the crankpin to be ground in axial alignment with the axis of rotation of said pot chucks.

12. In a crankshaft grinding machine having a plurality of spaced grinding units, one unit for each crankpin on the crankshaft to be ground, a pair of spaced axially aligned synchronously rotatable pot chucks on each of said units, a work supporting bearing surface on each of said pot chucks, said bearing surface being located in different positions on each pair of pot chucks precisely to support a crankpin to be ground with a different crankpin aligned with the axis of the pot chucks on each unit, a work locating surface on one of said pot chucks in each pair engageable with a locating surface on the crankshaft to be ground, means cooperating therewith to maintain a portion of a crankshaft thereagainst precisely to position a crankshaft with the crankpin to be ground in axial alignment with the axis of rotation of said pot chucks at each grinding unit, and automatically actuated transfer mechanism to transfer crankshafts to be ground from the pot chucks on one unit in an oriented position into the pot chucks on the next unit.

13. In a crankshaft grinding machine having a plurality of spaced grinding units, successive units being arranged simultaneously to grind a different crankpin on a crankshaft, a longitudinally indexable work loading conveyor mechanism successively to index crankshafts to be ground into predetermined loading positions adjacent to each grinding unit, means including a motor to index said conveyor mechanism, a plurality of spaced pairs of V-blocks for supporting a plurality of crankshafts thereon in predetermined positions adjacent to each grinding unit, means actuated by and in timed relation with the loading of crankshafts to be ground into said units intermittently to index said loading conveyor mechanism, and a by-pass mechanism associated with said conveyor mechanism automatically to transfer a crankshaft to the next pair of V-blocks on said loading mechanism so as to by-pass a grinding unit when said unit is inoperative so as to facilitate an indexing movement of said loading mechanism.

14. In a crankshaft grinding machine, as claimed in claim 13, in combination with the parts and features therein specified of a reversible motor operatively connected to actuate said by-pass mechanism, and means including a limit switch actuated during the indexing of said loading mechanism to start the by-pass mechanism motor in the reverse direction to return the intermediate loader mechanism to its initial position.

15. In a crankshaft grinding machine, as claimed in claim 13, in combination with the parts and features therein specified of a fluid motor operatively connected to actuate said by-pass mechanism, a control valve therefor, and means including a limit switch actuated during the indexing of said loading mechanism to start the by-pass mechanism motor in the reverse direction to return the intermediate loader mechanism to its initial position.

16. In a crankshaft grinding machine having a plurality of spaced grinding units, successive units being arranged to grind a different crankpin on a crankshaft, a longitudinally indexable work loading mechanism including a pair of spaced link chains successively to index crankshafts to be ground into predetermined loading positions adjacent to each grinding unit, a plurality of spaced V-blocks on each of said chains for supporting a plurality of crankshafts thereon in predetermined positions adjacent to each grinding unit, means actuated automatically to intermittently index said loading mechanism for advancing crankshafts from one grinding unit to the next, a by-pass mechanism automatically to advance a crankshaft to the next pair of V-blocks on said chains in case a grinding unit is rendered inoperative so as to facilitate an indexing movement of said loading mechanism, and means actuated by and in timed relation with the loading mechanism during an indexing movement to return the by-pass mechanism to its initial position.

*17. A crankshaft grinding machine comprising a plurality of spaced independently operable grinding units, a pair of spaced axially aligned synchronously rotatable pot chucks on each of said units, an indexable work*

*conveyor mechanism successively to index a plurality of crankshafts into predetermined loading positions adjacent to each of said grinding units, a plurality of spaced work supporting brackets on said work conveyor mechanism to support a plurality of crankshafts in the same predetermined indexed position adjacent to each grinding unit, a work loader mechanism to transfer successive crankshafts to be ground from the conveyor mechanism into said pot chucks in said predetermined indexed position, precision angular positioning means disposed to maintain a crankshaft located in said pot chucks in said predetermined indexed position, and a work supporting bearing surface on each of said pot chucks to support the opposite ends of a crankshaft to be ground, each of said pot chucks and bearing surfaces being located in predetermined different angular positions relative to the axis of rotation of said pot chucks precisely to position a predetermined crankpin to be ground in axial alignment with said axis of rotation so that a crankshaft to be ground may be transferred vertically from the loader mechanism into the pot chucks.*

*18. In a crankshaft grinding machine having a plurality of spaced independently operable grinding units, each unit including a base, a pair of spaced axially aligned synchronously rotatable pot chucks on each of said bases for supporting opposite ends of a crankshaft to be ground and a transversely movable rotatable grinding wheel on each of said bases, a longitudinally indexable work conveyor mechanism operable to index a plurality of crankshafts to be ground into predetermined loading positions adjacent to each of said grinding units, an independently operable work loader on each of said grinding units, said work loaders being arranged to transfer crankshafts selectively from the conveyor mechanism to various grinding units and to transfer ground crankshafts selectively from various grinding units onto said conveyor mechanism.*

References Cited in the file of this patent or the original patent

UNITED STATES PATENTS

| | | |
|---|---|---|
| 2,241,342 | Flygare | May 6, 1941 |
| 2,623,429 | Meyer et al. | Dec. 30, 1952 |
| 2,651,895 | Rocks | Sept. 15, 1953 |
| 2,704,955 | Kendall et al. | Mar. 29, 1955 |